US008253585B2

(12) United States Patent
Hidalgo Rodrigo

(10) Patent No.: US 8,253,585 B2
(45) Date of Patent: Aug. 28, 2012

(54) THREE-PHASE MULTIFUNCTION VERIFIER

(76) Inventor: Emilio Hidalgo Rodrigo, Cuernavaca (MX)

( * ) Notice: Subject to any disclaimer, the term of this patent is extended or adjusted under 35 U.S.C. 154(b) by 413 days.

(21) Appl. No.: 12/592,056

(22) Filed: Nov. 19, 2009

(65) Prior Publication Data

US 2011/0115641 A1 May 19, 2011

(51) Int. Cl.
*G08B 23/00* (2006.01)

(52) U.S. Cl. ......... 340/870.02; 340/870.01; 340/870.07; 340/870.4; 705/412

(58) Field of Classification Search ............ 340/870.02, 340/870.07, 870.01, 870; 307/105; 327/52; 705/412
See application file for complete search history.

(56) References Cited

U.S. PATENT DOCUMENTS

| | | | | |
|---|---|---|---|---|
| 5,224,011 A * | 6/1993 | Yalla et al. | .................. | 361/93.2 |
| 7,085,589 B1 * | 8/2006 | Tezuka | .................. | 455/556.1 |
| 7,173,345 B2 * | 2/2007 | Brandt et al. | .................. | 307/1 |
| 8,004,119 B2 * | 8/2011 | Tsang et al. | .................. | 307/105 |

* cited by examiner

*Primary Examiner* — Lam T Mai

(57) ABSTRACT

Multifunctional meter measures voltage, current, demand, factor, power consumption also water, natural gas, fuel and other items. The design has a 16 bit micro-programmed processing unit, and manages interaction with different hardware components and realizes the functions of communication, data registry and operation control. Composed of a modular form and includes capacities for network connection and inclusion as a module within multi-point measurement systems. The modular components are: three-phase measurement machine, interface and peripherals for LCD screen, high precision clock in real time, external non-volatile memory bank (flash), energy failure detector to backup vital information for the meter, interface and peripherals for navigation buttons, interface and peripherals for RGB leds indicators of events and status, UART communications interface, RS 485 communication bus, ANSI C12 protocol optical communication interface, communications interface to external modules like Ethernet, GPRS, Wi Fi or compatibles, digital inputs for the interface of Sensory converters to pulses.

28 Claims, 4 Drawing Sheets

THREE-PHASE MULTIFUNCTION VERIFIER

FIELD OF THE INVENTION

The present invention relates to an energy verifier and, more particularly, to an energy verifier that can measure electrical energy, water, gas, diesel, combustibles, etc.

BACKGROUND OF THE INVENTION

The problem this invention solves, is having a high precision metering device to monitor the variables involved in the consumption of electrical energy as well as consumption of other items such as water and fuels, with the intended result of knowing these variables and have the ability to better administer their use.

In addition it provides capacities for the storage of historical data since the use of the energy can only be quantified over a long period of the time.

All these integrating connectivity capacities makes it possible to access information in a fast and simple way.

Many other solutions as far as measurement equipment exist, some even exist that also measure other variables besides electrical energy. Principally the differences occur in the focus of the measurements and it classifies them in other categories, ours is equipment that is focused from the beginning in administration of energy use. Other solutions include U.S. Pat. No. 4,106,095 issued to Yarbrough for an Electrical usage display system, U.S. Pat. No. 4,904,995 issued to Bonner for an Integrated remote electricity meter transponder and combination, et al., U.S. Pat. No. 5,136,514 issued to Laumann for a Tariff arrangement with secure bidirectional interface, U.S. Pat. No. 5,153,837 issued to Shaffer, et al. for a Utility consumption monitoring and control system, U.S. Pat. No. 5,438,329 issued to Gastouniotis, et al. for a Duplex bi-directional multi-mode remote instrument reading and telemetry system, U.S. Pat. No. 6,219,655 issued to Schleich, et al. for a Method of RF-based communication, U.S. Pat. No. 6,226,600 issued to Rodenberg, III, et al. for a Programmable electricity consumption monitor, U.S. Pat. No. 6,452,505 issued to Taglioni for a Utility disconnect controller, U.S. Pat. No. 6,906,637 issued to Martin for a System to measure density, specific gravity, and flow rate of fluids, meter, and related methods, U.S. Pat. No. 6,957,586 issued to Sprague for a System for measuring domestic consumption of electricity, heat, water and gas, U.S. Pat. No. 7,174,263 issued to Shajii, et al. for an External volume insensitive flow verification, U.S. Pat. No. 7,463,991 issued to Shajii, et al for a Mass flow verifier with flow restrictor.

One of the main characteristics which is lacking in existing equipment is its capacity to connect to a network and the inclusion like a module within measurement systems of multiple points. That is to say, include the same equipment hardware within a single cabinet with other measuring devices that are in charge of measuring a number of groups of energy users (multi-point concept).

Any equipment developed in Mexico of similar characteristics does not exist.

SUMMARY OF THE INVENTION

In accordance with the present invention, there is provided a multifunctional meter of energy consumption capable of measuring voltage, current, demand, power factor, power consumption and four additional variables for data provided from alternate meters of water, natural gas, fuel or any other item that can be adapted with a pulse output meter sensor. The design concentrates itself in a 16 bit micro-programmed processing unit using a micro-controller as a CPU, which manages the interaction with the different hardware components and realises the functions of communication, registry of data and control of operations. The design is composed of a modular form and includes capacities for network connection and the inclusion like a module within multi-point measurement systems. The modular components of the design are: three-phase measurement machine, interface and peripherals for LCD screen, high precision real-time clock, external non-volatile memory bank (flash), energy fault detector to backup vital information for the meter, interface and peripherals for navigation buttons, interface and peripherals for leds RGB indicators of events and status, UART communications interface, RS 485 communication bus, optical communication interface for ANSI C12.18 protocol, communications interface to extend to external modules of remote access like Ethernet, GPRS, radio frequency, Wi Fi or compatibles, digital inputs for the interface of pulse output sensors.

It would be advantageous to provide a meter focused on the administration of power.

It would also be advantageous to provide a meter whose use is not dependent on the user having specialized prior knowledge.

It would further be advantageous to provide a meter with wide range of communication options.

It would also be further advantageous to provide a meter with measurement capacity of multiple variables.

It would furthermore be advantageous to provide a meter with memory storage capacity capable of expansion (data logger).

It would be additionally advantageous to provide a meter with the capacity for its inclusion within multi-point measurement schemes.

It would be also of further advantage to provide a meter with a modular system of high integration.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
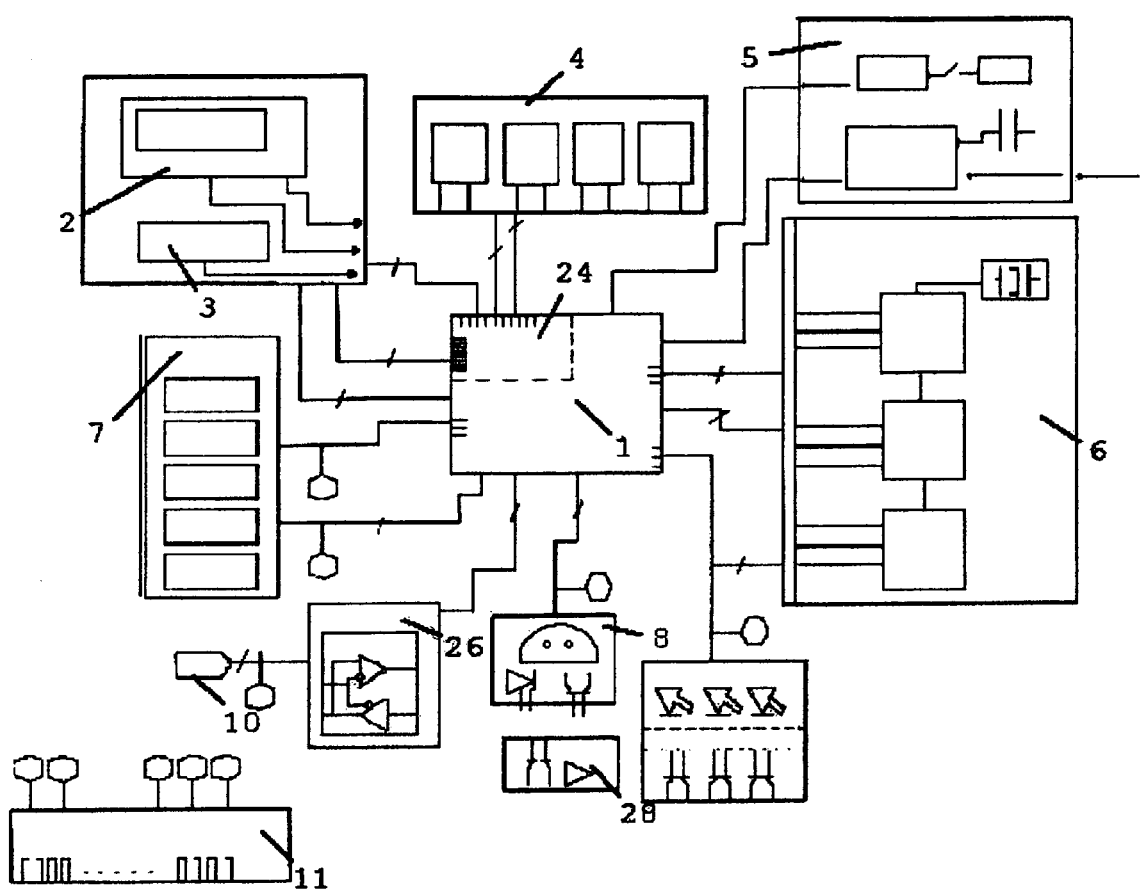
FIG. 1 is a front exploded view of a FIG. 1 is a schematic diagram showing the modules that comprise the invention's integral modular system.

FIG. 1 shows the complete schematic diagram of the Triphase Multifunction Verifier 6. The design of the Triphase Multifunction Verifier 6 centers on a processing unit based on a RISK type micro-controller 1 with a 16 bit nucleus with a 50 MHz operating frequency. The micro-controller 1 has 3 SCI 14 ports, an SPI 22 port, an I2C 15 port, a 16 bit port for keyboard 3 and external interrupts, 16 bit general purpose 25 port with option for interruption trigger, 16 bit general purpose 25 port, 6 channels of pulse width modulation (PWM), 4 channel timers, two digital to analog converters, a 6 channel analog to digital converter, configurable watchdog timer, 128 K of Flash EEPROM and 8K of RAM.

The user interface module 24 includes interconnections of up to 16 keys cabled directly to the port available for the keyboard 3, wired connections from the general purpose 25 port towards a connection for an LCD 2 display of 8 bits connecting the signals of display control to three additional bits of the same port.

Figure 2:
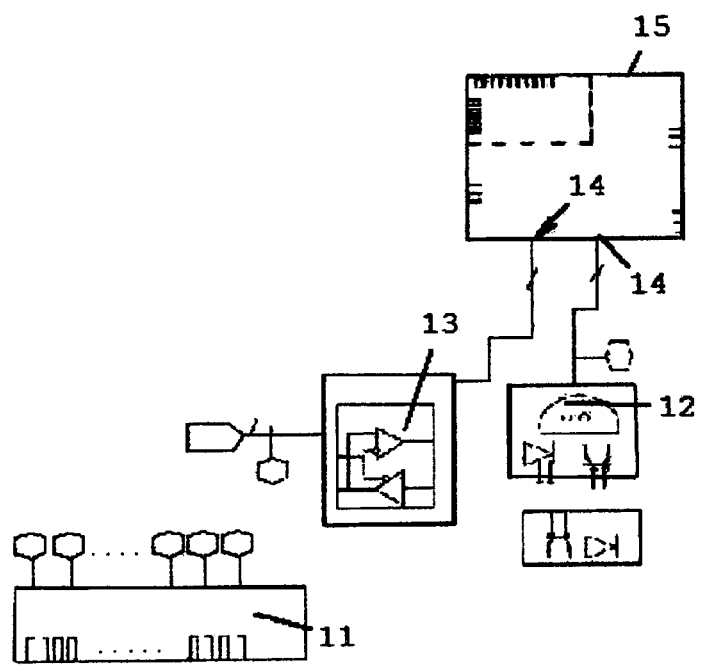
FIG. 2 is a bottom exploded view of a FIG. 2 is a schematic drawing of a triphase multifunction verifier.

FIG. 2 shows the communication module which includes the circuitry to connect one of the SCI 14 ports to optical couplers for its connection by means of an optical probe 28 being using an infrared diode and a phototransistor with its respective polarization resistance and a transistor like switchboard to receive and establish the digital thresholds of the phototransistor (ANSI C12. 18 type optical port 8). Another of the SCI 14 channels is connected to a standard transceiver 13 for a 3 volt RS 485 BUS 10 to which is included minimum circuitry and a connector with a receiver for its connection to an RS 485 network 26. The additional SCI 14 port is interconnected directly to an external receiver for an in series direct connection by means of TTL signals, useful to provide transparent communication with serial circuits adapters to another media type and to obtain with this its connection to a remote module (remote communication 7).

A specialized of realtime clock 16 (RTC) circuit of high precision with quartz crystal including an internal real time clock generator is added. At the same time it includes backup energy circuitry with a 3.3 volt battery 17 utilizing an internal switchboard which detects energy failures. The real time circuit communicates with the micro-controller 1 through the I2C 15 port using simple serial commands and readings from the realtime clock 16 (RTC) internal time registry.

An energy failure detection module is included using a specialized integrated circuit supervisor 18 which is in charge of providing an unmaskable interruption to the micro-controller 1 and using a capacitor of great capacity provides backup power with sufficient back-up energy as to provide the opportunity to store the essential information for the function, in addition this circuit provides an external watchdog timer which is required to be take care of by a general purpose 25 line of one of the ports to avoid it from realizing a reset since it is connected directly to the micro-controller's general reset terminal. The two elements described above (RTC, supervisor 18) make up a backup module 5 that guarantees the correct operation of the equipment even though there is a power failure.

Figure 3:
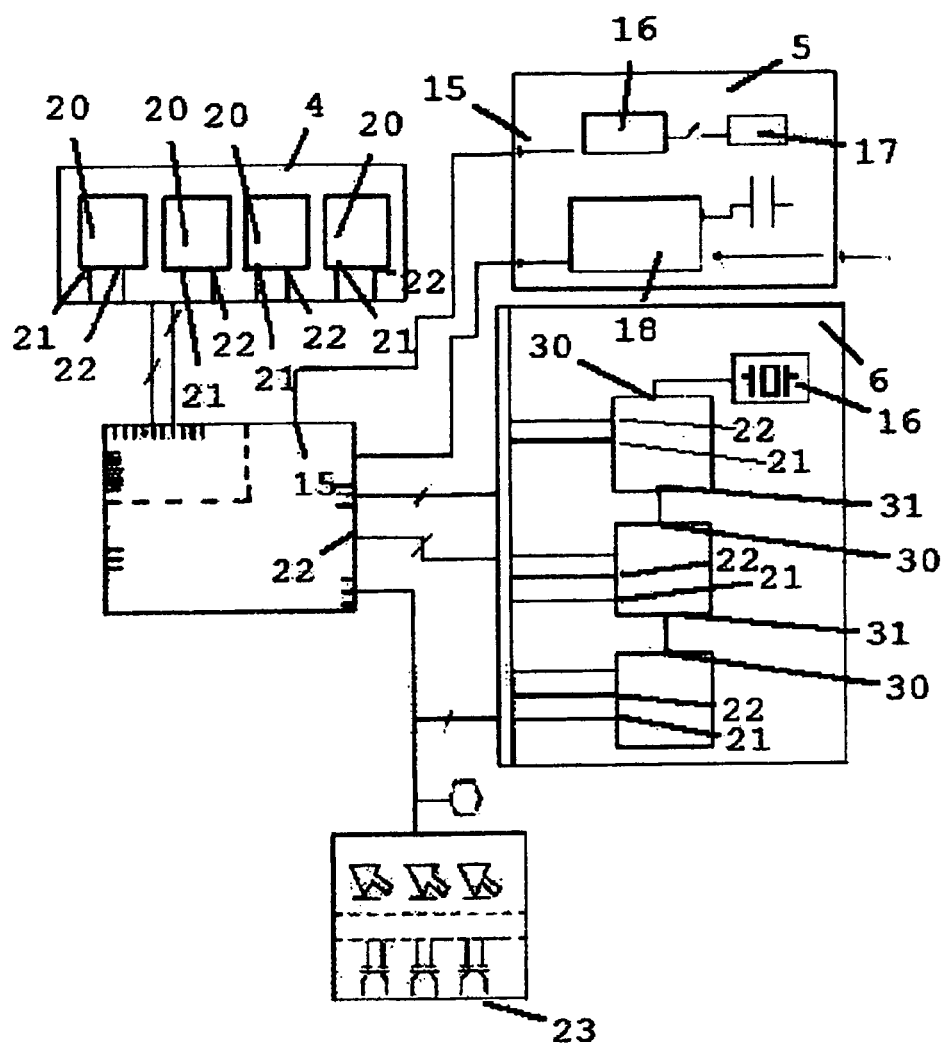
FIG. 3 is a right exploded view of a FIG. 3 is a schematic drawing of a triphase multifunction verifier.
Figure 4:
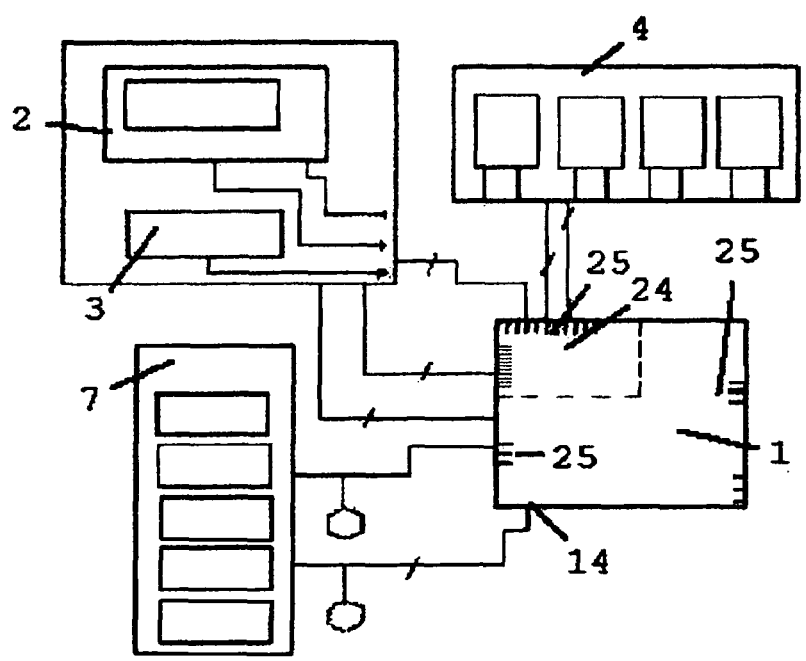
FIG. 4 is a left plan view of a FIG. 4 is a schematic drawing of a triphase multifunction verifier.

By means of three general purpose 25 lines shown in FIG. 4, and up to 4 additional lines of the same type an SPI 22 channel of emulation for communication with integrated circuits of serial flash 20 memory is established as seen in FIG. 3. The first two lines emulate the inherent SPI 22 signal lines and the additional ones are used for selection as the slave (CS 21 memory) with which communication is required. This emulated SPI 22 connects to the memory bus having for its operation a memory bank 4 resulting from the sum of the capacities of each individual memory. This memory bank 4 is used to store the periodic historical data and provides the functionality with external not-volatile registry of data. The circuitry is required for the operation of the memory and is added strictly speaking.

FIG. 3 also shows the input and output real time clock signal lines of CK which are CKI 30 and CKO 31 respectively. CKI 30 and CKO 31 are real time clock clock signals. Normally the digital circuits need a signal that provides clock pulses for its operation, this signal commonly is known as CK, the signal CKI 30 signals are the real time clock signals input to the verifier's specialized measurement circuits, the first of directly takes the signal for CKI 30 from the quartz crystal. In the diagram, CKO 31 are the output real time clock signals of the integrated circuits that appear in the same circuit. The first two measurement circuits of verifier pass along pass along their real time clock signal by means of CKO 31 and the circuit that receives this signal captures it by CKI 30. In this manner, the third set of circuits only receives signals from CKI 30 but it does not use CKO 31 whereas both of the previous circuits use CKI 30 signal lines.

FIG. 4 shows the resistive and transistorized couplers for the connection of 4 entrances originating from pulses equivalent to the measurement of some cumulative variable are included, allowing with this the interaction with digital output devices or collectors or open sources without distinction. These entrances interconnect with general purpose 25 lines with associated interruption and the possibility of external connection with the micro-controller's timer channels. General purpose 25 digital output lines are prepared in addition towards external connectors for the possible control of relays, actuators or external load control modules.

The tri-phase electrical parameters measurement module (tri-phase measurement machine) is based on an integrated circuit of specific intention for the monitoring of analogical inputs connected with alternating current and voltage, direct or composed. The measurement machine is made up of a tri-phase adjustment that uses three circuits mentioned before and providing the real time clock circuitry necessary for its operation by means of a quartz crystal and capacitive elements to later share its real time clock signal with the remaining two circuits and in this manner to assure synchronicity for the measurements. In addition, to each circuit is added additional elements of high precision for polarization and connection of signals and is equipped with the necessary control lines for the calibration of the equipment. The communication of the micro-controller 1 with this measurement machine is realized through an SPI 22 bus and using additional lines for the selection of the slave, the measurement circuits provide their information in the form of registry and with pulse energy signals connected to the micro-controller's interruption inputs and an optical coupling port to realize the calibration and precision 23 tests.

Additionally, circuitry required for the operation of the micro-controller 1 is provided e.g.: capacitive elements, quartz crystal and elements of protection against discharges of static electricity and short circuit. In addition, a feeding module with a converter of CD to CD is included and takes a voltage from CD from an externally connected source and converts it and regulates to provide the necessary feeding voltages for integrated circuits and peripherals (5 and 3 volts).

An external communications power module on which is annexed direct connections for measurement of electrical phases and inputs of pulses are realized, this module, includes the necessary protections from overvoltage, over current and short circuit, connecting itself through a connector with receiver terminals (fingered) or through a flat cable connector with connection to a strip of terminals of the main board.

The terminal connector at the edge of the main card (edge connector 11) includes all the signals of measurement and communications with the outside and in addition allows its connection with multi-point measurement systems by measuring card insertion of the same type under the philosophy of Hot Swap.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A three-phase multifunction verifier for the electrical energy consumer to know their daily consumption, the costs and the quality of energy he receives, comprising:

means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for viewing information, rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for typing data and commands into the verifier, rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for guaranteeing the correct operation of the equipment even though there is a power failure, rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for allowing the supervision and measurement personnel of the company supplying service to accede and extract information from the management system, and especially of the control or server module by means of a wireless connection between this one and a portable reading unit;

the wireless connection module (3) also can, by means of connection by line "b" to the server module (1) to determine the data of current consumption to the subscriber's measuring module (4) and an additional measurer in the unfolding, registry and load module (6) which by difference can determine the possible escape or theft of service between these two comparison points, allowing the service subscriber to be alerted so that this one has authentic elements to demand of the service supplier to take pertinent measures in order to avoid this theft or escape, rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for receiving and establishing the digital thresholds of the phototransistor;

means for connecting to an rs 485 network;

means for containing all the signals of measurement and communications with the outside and in addition allowing connection with multi-point measurement systems by measuring card insertion of the same type;

means for managing the optical port r, rigidly connected to said means for receiving and establishing the digital thresholds of the phototransistor, and rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for allowing connection of the sci channels to the rs 485 bus;

means for allowing the transference of data;

means for attaching low-speed peripherals to the embedded system;

means for communicating with the micro-controller through the i2c port using simple serial commands and readings from the real time clock (rtc) internal time registry;

means for providing feed including when the equipment is without power;

means for controlling the provision of an unmaskable interruption to the micro-controller and using a capacitor of great capacity to provide backup power with sufficient back-up energy as to provide the opportunity to store the essential information for the function, and additionally provides an external watchdog timer to take care of by a general purpose line, one of the ports to avoid it from realizing a resumption since it is connected directly to the micro-controller's general reset terminal;

means for storing the periodic historical data and providing the functionality with external not-volatile registry of data;

means for communicating in master/slave mode when the master device initiates the data frame;

means for verifying the exactitude of the measurements by master verifiers, rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for providing an interface with the user to visualize the information contained in the verifier and communication with the equipment;

means for general purpose communication;

means for providing communication within the verifier, rigidly connected to said means for allowing connection of the sci channels to the rs 485 bus, and rigidly connected to said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

means for connecting to the optical port based on the optical communication standard as described in ansi c12, rigidly connected to said means for receiving and establishing the digital thresholds of the phototransistor;

means for providing clock pulses for the operation of the digital circuits; and means for passing along the clock signals from the previous circuit to the following circuit, rigidly connected to said means for providing clock pulses for the operation of the digital circuits.

2. The three-phase multifunction verifier in accordance with claim 1, wherein said means for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have comprises a processing unit based on a risk type micro-controller with a 16 bit nucleus and a 50 mhz operation frequency, the micro-controller contains 3 sci 14 ports, a spi 22 port, a i2c 15 port, a 16 bit port for keyboard 3 and external interrupts, general purpose 25 16 bit port with firing option interruption, general purpose 25 16 bit port, 6 modulation pulse width channels (pwm), 4 timer channels, two digital to analog converters, a 16 channel analog to digital converter, watchdog timer configurable, 128 k of eeprom flash and 8k of ram micro-controller.

3. The three-phase multifunction verifier in accordance with claim 1, wherein said means for viewing information comprises a display of 8 bits with 2 lines and 20 characters per line lcd.

4. The three-phase multifunction verifier in accordance with claim 1, wherein said means for typing data and commands into the verifier comprises a pushbutton type arranged to provide 16 keys keyboard.

5. The three-phase multifunction verifier in accordance with claim 1, wherein said means for guaranteeing the correct operation of the equipment even though there is a power failure comprises a made up of two elements, the realtime clock (rtc) and the supervisor module backup module.

6. The three-phase multifunction verifier in accordance with claim 1, wherein said means for allowing the supervision and measurement personnel of the company supplying service to accede and extract information from the management system, and especially of the control or server, module by means of a wireless connection between this one and a portable reading unit;

the wireless connection module (3) also can, by means of connection by line "b" to the server module (1) to determine the data of current consumption to the subscriber's measuring module (4) and an additional measurer in the unfolding, registry and load module (6) which by difference can determine the possible escape or theft of service between these two comparison points, allowing the service subscriber to be alerted so that this one has authentic elements to demand of the service supplier to take pertinent measures in order to avoid this theft or escape comprises a module made up of several types of generic converters for standard communication (ethernet, wi-fi, gprs, plc, etc.) to serial using one of the microcontroller's serial communication channels remote communication.

7. The three-phase multifunction verifier in accordance with claim 1, wherein said means for receiving and establishing the digital thresholds of the phototransistor comprises a phototransistor with its respective polarization resistance and a transistor like switchboard optical port.

8. The three-phase multifunction verifier in accordance with claim 1, wherein said means for connecting to an rs 485 network comprises a standard 3 volt transceiver with minimum circuitry and a connector with a receiver rs 485 bus.

9. The three-phase multifunction verifier in accordance with claim 1, wherein said means for containing all the signals of measurement and communications with the outside and in addition allowing connection with multi-point measurement systems by measuring card insertion of the same type comprises the terminal connector at the edge of the main card includes all the signals of measurement and communications with the outside edge connector.

10. The three-phase multifunction verifier in accordance with claim 1, wherein said means for managing the optical port, r comprises a protocol used for two-way communications with an electricity meter ansi c12.18.

11. The three-phase multifunction verifier in accordance with claim 1, wherein said means for allowing connection of the sci channels to the rs 485 bus comprises a device that receives and sends signals over a medium transceiver.

12. The three-phase multifunction verifier in accordance with claim 1, wherein said means for allowing the transference of data comprises a general purpose serial bus sci.

13. The three-phase multifunction verifier in accordance with claim 1, wherein said means for attaching low-speed peripherals to the embedded system comprises a multi-master serial computer bus i2c.

14. The three-phase multifunction verifier in accordance with claim 1, wherein said means for communicating with the micro-controller through the i2c port using simple serial commands and readings from the real time clock (rtc) internal time registry comprises a specialized circuit of high precision with quartz crystal and internal clock generator realtime clock.

15. The three-phase multifunction verifier in accordance with claim 1, wherein said means for providing feed including when the equipment is without power comprises a generic backup battery for the real time clock 3.3 volt battery.

16. The three-phase multifunction verifier in accordance with claim 1, wherein said means for controlling the provision of an unmaskable interruption to the micro-controller and using a capacitor of great capacity to provide backup power with sufficient back-up energy as to provide the opportunity to store the essential information for the function, and additionally provides an external watchdog timer to take care of by a general purpose line, one of the ports to avoid it from realizing a resumption since it is connected directly to the micro-controller's general reset terminal comprises a miniaturized electronic circuit supervisor.

17. The three-phase multifunction verifier in accordance with claim 1, wherein said means for storing the periodic historical data and providing the functionality with external not-volatile registry of data comprises an integrated circuit of non-volatile memory serial flash.

18. The three-phase multifunction verifier in accordance with claim 1, wherein said means for communicating in master/slave mode when the master device initiates the data frame comprises a synchronous serial data link standard spi.

19. The three-phase multifunction verifier in accordance with claim 1, wherein said means for verifying the exactitude of the measurements by master verifiers comprises an optical interface and is included the optical pulse output equipment but not its counterpart calibration and precision.

20. The three-phase multifunction verifier in accordance with claim 1, wherein said means for providing an interface with the user to visualize the information contained in the verifier and communication with the equipment comprises an it is composed of the lcd display, keyboard and optical port user interface module.

21. The three-phase multifunction verifier in accordance with claim 1, wherein said means for general purpose communication comprises a communication line general purpose.

22. The three-phase multifunction verifier in accordance with claim 1, wherein said means for providing communication within the verifier comprises a generic communication network with 2 threads specified in the standard rs 485 rs 485 network.

23. The three-phase multifunction verifier in accordance with claim 1, wherein said means for connecting to the optical port based on the optical communication standard as described in ansi c12 comprises an accessory optical device optical probe.

24. The three-phase multifunction verifier in accordance with claim 1, wherein said means for providing clock pulses for the operation of the digital circuits comprises a clock signals cki.

25. The three-phase multifunction verifier in accordance with claim 1, wherein said means for passing along the clock signals from the previous circuit to the following circuit comprises a clock signals cko.

26. A three-phase multifunction verifier for the electrical energy consumer to know their daily consumption, the costs and the quality of energy he receives, comprising:

a processing unit based on a risk type micro-controller with a 16 bit nucleus and a 50 mhz operation frequency, the micro-controller contains 3 sci 14 ports, a spi 22 port, a i2c 15 port, a 16 bit port for keyboard 3 and external interrupts, general purpose 25 16 bit port with firing option interruption, general purpose 25 16 bit port, 6 modulation pulse width channels (pwm), 4 timer channels, two digital to analog converters, a 16 channel analog to digital converter, watchdog timer configurable, 128 k of eeprom flash and 8 k of ram micro-controller, for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

a display of 8 bits with 2 lines and 20 characters per line lcd, for viewing information, rigidly connected to said micro-controller;

a pushbutton type arranged to provide 16 keys keyboard, for typing data and commands into the verifier, rigidly connected to said micro-controller;

a made up of two elements, the realtime clock (rtc) and the supervisor module backup module, for guaranteeing the correct operation of the equipment even though there is a power failure, rigidly connected to said micro-controller;

a module made up of several types of generic converters for standard communication (ethernet, wi-fi, gprs, plc, etc.) to serial using one of the microcontroller's serial communication channels remote communication, for allowing the supervision and measurement personnel of the company supplying service to accede and extract information from the management system, and especially of the control or server module by means of a wireless connection between this one and a portable reading Unit;

the wireless connection module (3) also can, by means of connection by line "b" to the server module (1) to determine the data of current consumption to the subscriber's measuring module (4) and an additional measurer in the unfolding, registry and load module (6) which by difference can determine the possible escape or theft of service between these two comparison points, allowing the service subscriber to be alerted so that this one has authentic elements to demand of the service supplier to take pertinent measures in order to avoid this theft or escape, rigidly connected to said micro-controller;

a phototransistor with its respective polarization resistance and a transistor like switchboard optical port, for receiving and establishing the digital thresholds of the phototransistor;

a standard 3 volt transceiver with minimum circuitry and a connector with a receiver rs 485 bus, for connecting to an rs 485 network;

the terminal connector at the edge of the main card includes all the signals of measurement and communications with the outside edge connector, for containing all the signals of measurement and communications with the outside and in addition allowing connection with multipoint measurement systems by measuring card insertion of the same type;

a protocol used for two-way communications with an electricity meter ansi c12.18, for managing the optical port r, rigidly connected to said optical port, and rigidly connected to said micro-controller;

a device that receives and sends signals over a medium transceiver, for allowing connection of the sci channels to the rs 485 bus;

a general purpose serial bus sci, for allowing the transference of data;

a multi-master serial computer bus i2c, for attaching low-speed peripherals to the embedded system;

a specialized circuit of high precision with quartz crystal and internal clock generator realtime clock, for communicating with the micro-controller through the i2c port using simple serial commands and readings from the real time clock (rtc) internal time registry;

a generic backup battery for the real time clock 3.3 volt battery, for providing feed including when the equipment is without power;

a miniaturized electronic circuit supervisor, for controlling the provision of an unmaskable interruption to the micro-controller and using a capacitor of great capacity to provide backup power with sufficient back-up energy as to provide the opportunity to store the essential information for the function, and additionally provides an external watchdog timer to take care of by a general purpose line, one of the ports to avoid it from realizing a resumption since it is connected directly to the micro-controller's general reset terminal;

an integrated circuit of non-volatile memory serial flash, for storing the periodic historical data and providing the functionality with external not-volatile registry of data;

a synchronous serial data link standard spi, for communicating in master/slave mode when the master device initiates the data frame;

an optical interface and is included the optical pulse output equipment but not its counterpart calibration and precision, for verifying the exactitude of the measurements by master verifiers, rigidly connected to said micro-controller;

an it is composed of the lcd display, keyboard and optical port user interface module, for providing an interface with the user to visualize the information contained in the verifier and communication with the equipment;

a communication line general purpose, for general purpose communication;

a generic communication network with 2 threads specified in the standard rs 485 rs 485 network, for providing communication within the verifier, rigidly connected to said transceiver, and rigidly connected to said micro-controller;

an accessory optical device optical probe, for connecting to the optical port based on the optical communication standard as described in ansi c12, rigidly connected to said optical port;

a clock signals cki, for providing clock pulses for the operation of the digital circuits; and a clock signals cko, for passing along the clock signals from the previous circuit to the following circuit, rigidly connected to said CKI.

27. The three-phase multifunction verifier as recited in claim 26, further comprising:

an arrangement of flash serial generic flash memory memory bank, for storing the periodic historical data and providing the functionality with external not-volatile registry of data, rigidly connected to said micro-controller.

28. A three-phase multifunction verifier for the electrical energy consumer to know their daily consumption, the costs and the quality of energy he receives, comprising:

a processing unit based on a risk type micro-controller with a 16 bit nucleus and a 50 mhz operation frequency, the micro-controller contains 3 sci 14 ports, a spi 22 port, a i2c 15 port, a 16 bit port for keyboard 3 and external interrupts, general purpose 25 16 bit port with firing option interruption, general purpose 25 16 bit port, 6 modulation pulse width channels (pwm), 4 timer channels, two digital to analog converters, a 16 channel analog to digital converter, watchdog timer configurable, 128 k of eeprom flash and 8k of ram micro-controller, for providing the connection and disconnection of multiple subscribers based on the indication of consumption obtained by means of a secure connection, with a single wire data line in an internal channel with each individual measurer located within the cabinet, this connection includes a validation protocol and protection that guarantees the communication in surroundings subject to noises by electrostatic or electromagnetic discharges for the unequivocal identification of the subscriber;

the individual connection can be considered a modular type and each one of the individual outputs to each subscriber includes redundant relays that assure the connectivity;

the internal security communication uses a receiving transmitter/receiver for each module and forms a network that periodically interrogates each subscriber's measurer in order to obtain a summary of consumption and the state the connection must have;

a display of 8 bits with 2 lines and 20 characters per line lcd, for viewing information, rigidly connected to said micro-controller;

a pushbutton type arranged to provide 16 keys keyboard, for typing data and commands into the verifier, rigidly connected to said micro-controller;

an arrangement of flash serial generic flash memory memory bank, for storing the periodic historical data and providing the functionality with external not-volatile registry of data, rigidly connected to said micro-controller;

a made up of two elements, the realtime clock (rtc) and the supervisor module backup module, for guaranteeing the correct operation of the equipment even though there is a power failure, rigidly connected to said micro-controller;

a module made up of several types of generic converters for standard communication (ethernet, wi-fi, gprs, plc, etc.) to serial using one of the microcontroller's serial communication channels remote communication, for allowing the supervision and measurement personnel of the company supplying service to accede and extract information from the management system, and especially of the control or server module by means of a wireless connection between this one and a portable reading unit;

the wireless connection module (3) also can, by means of connection by line "b" to the server module (1) to determine the data of current consumption to the subscriber's measuring module (4) and an additional measurer in the unfolding, registry and load module (6) which by difference can determine the possible escape or theft of service between these two comparison points, allowing the service subscriber to be alerted so that this one has authentic elements to demand of the service supplier to take pertinent measures in order to avoid this theft or escape, rigidly connected to said micro-controller;

a phototransistor with its respective polarization resistance and a transistor like switchboard optical port, for receiving and establishing the digital thresholds of the phototransistor;

a standard 3 volt transceiver with minimum circuitry and a connector with a receiver rs 485 bus, for connecting to an rs 485 network;

the terminal connector at the edge of the main card includes all the signals of measurement and communications with the outside edge connector, for containing all the signals of measurement and communications with the outside and in addition allowing connection with multipoint measurement systems by measuring card insertion of the same type;

a protocol used for two-way communications with an electricity meter ansi c12.18, for managing the optical port r, rigidly connected to said optical port, and rigidly connected to said micro-controller;

a device that receives and sends signals over a medium transceiver, for allowing connection of the sci channels to the rs 485 bus;

a general purpose serial bus sci, for allowing the transference of data;

a multi-master serial computer bus i2c, for attaching low-speed peripherals to the embedded system;

a specialized circuit of high precision with quartz crystal and internal clock generator realtime clock, for communicating with the micro-controller through the i2c port using simple serial commands and readings from the real time clock (rtc) internal time registry;

a generic backup battery for the real time clock 3.3 volt battery, for providing feed including when the equipment is without power;

a miniaturized electronic circuit supervisor, for controlling the provision of an unmaskable interruption to the micro-controller and using a capacitor of great capacity to provide backup power with sufficient back-up energy as to provide the opportunity to store the essential information for the function, and additionally provides an external watchdog timer to take care of by a general purpose line, one of the ports to avoid it from realizing a resumption since it is connected directly to the micro-controller's general reset terminal;

an integrated circuit of non-volatile memory serial flash, for storing the periodic historical data and providing the functionality with external not-volatile registry of data;

a synchronous serial data link standard spi, for communicating in master/slave mode when the master device initiates the data frame;

an optical interface and is included the optical pulse output equipment but not its counterpart calibration and precision, for verifying the exactitude of the measurements by master verifiers, rigidly connected to said micro-controller;

an it is composed of the lcd display, keyboard and optical port user interface module, for providing an interface with the user to visualize the information contained in the verifier and communication with the equipment;

a communication line general purpose, for general purpose communication;

a generic communication network with 2 threads specified in the standard rs 485 rs 485 network, for providing communication within the verifier, rigidly connected to said transceiver, and rigidly connected to said micro-controller;

an accessory optical device optical probe, for connecting to the optical port based on the optical communication standard as described in ansi c12, rigidly connected to said optical port;

a clock signals cki, for providing clock pulses for the operation of the digital circuits; and a clock signals cko, for passing along the clock signals from the previous circuit to the following circuit, rigidly connected to said CKI.

\* \* \* \* \*